(12) United States Patent
Deerberg et al.

(10) Patent No.: US 8,944,390 B2
(45) Date of Patent: Feb. 3, 2015

(54) CONNECTION MECHANISM FOR CONNECTION OF ARMRESTS TO TABLES OR CHAIRS

(75) Inventors: Manuel Deerberg, Hille (DE); Tom Orlitz, Neuzelle (DE)

(73) Assignee: Soleni Classic GmbH (DE)

( * ) Notice: Subject to any disclaimer, the term of this patent is extended or adjusted under 35 U.S.C. 154(b) by 805 days.

(21) Appl. No.: 12/673,832

(22) PCT Filed: Mar. 5, 2008

(86) PCT No.: PCT/EP2008/001729
§ 371 (c)(1),
(2), (4) Date: Jun. 29, 2010

(87) PCT Pub. No.: WO2008/107165
PCT Pub. Date: Sep. 12, 2008

(65) Prior Publication Data
US 2011/0192947 A1    Aug. 11, 2011

(30) Foreign Application Priority Data
Mar. 7, 2007    (DE) .................... 20 2007 003 390 U

(51) Int. Cl.
*B68G 5/00*    (2006.01)
*B43L 15/00*    (2006.01)
(Continued)

(52) U.S. Cl.
CPC . *A47C 1/11* (2013.01); *A47B 37/00* (2013.01); *A47C 7/546* (2013.01)
USPC ................ 248/118; 248/220.21; 248/223.41; 248/224.7; 248/314; 248/407; 248/408; 248/409; 248/118.1; 248/118.3; 248/118.5; 297/411.2; 297/411.23; 297/394; 297/411.26; 297/411.27; 297/411.28; 297/411.29; 403/319; 403/321; 403/322.1; 403/325

(58) Field of Classification Search
USPC ............ 248/220.21, 223.41, 224.7, 314, 407, 248/408, 409, 118, 118.1, 118.3, 118.5; 297/411.2, 411.23, 394, 297/411.26–411.29; 403/319, 321, 322.1, 403/325
See application file for complete search history.

(56) References Cited

U.S. PATENT DOCUMENTS 1,706,634 A * 3/1929 Seils ........................ 297/411.22
2,221,371 A * 11/1940 De Bethune .................. 403/328
(Continued)

FOREIGN PATENT DOCUMENTS

DE    3619944    12/1987
DE    4330448    3/1995
(Continued)

OTHER PUBLICATIONS

International Search Report for PCT/EP2008/001729, Sep. 8, 1009, EPO.
(Continued)

*Primary Examiner* — Christopher Garft
(74) *Attorney, Agent, or Firm* — Bourque and Associates, PA

(57) ABSTRACT

A connection mechanism is configured in particular for the connection of armrests to cosmetic tables or cosmetic chairs. The mechanism includes a base element (1). The base element (1) has a fastening section (1*a*) for fastening to a piece of furniture, in particular a piece of furniture for sitting or reclining. The base element also has a fastening element (2) configured for attachment to a part to be connected to the piece of furniture, in particular an armrest. The fastening element (2) is configured for a detachable connection to the fastening section (1*a*). The fastening section (1*a*) has a receiving device (1*b*) for receiving a region (2*b*) of the fastening element (2). A securing device (3) is provided that engages in the receiving device (1*b*) in the region (2*b*) of the fastening element (2) when said fastening element is received therein.

4 Claims, 1 Drawing Sheet

(51) Int. Cl.
*A47C 7/54* (2006.01)
*B60N 2/46* (2006.01)
*A47C 1/11* (2006.01)
*A47B 37/00* (2006.01)

(56) References Cited

U.S. PATENT DOCUMENTS

| | | | |
|---|---|---|---|
| 2,579,947 A * | 12/1951 | Mcilwaine | 160/45 |
| 3,260,541 A | 7/1966 | Sadler et al. | |
| 3,993,350 A | 11/1976 | McFarlane | |
| 4,760,984 A * | 8/1988 | Hennessey | 248/121 |
| 5,902,005 A * | 5/1999 | Lewczyk et al. | 296/153 |
| 5,934,756 A * | 8/1999 | Smith | 297/411.32 |
| 5,950,463 A * | 9/1999 | Glazier et al. | 70/202 |
| 6,585,444 B1 * | 7/2003 | Podbutzky | 403/322.1 |
| 2002/0017813 A1 | 2/2002 | Greene | |
| 2006/0083582 A1 * | 4/2006 | Balsells | 403/325 |
| 2008/0018160 A1 * | 1/2008 | Otto et al. | 297/411.2 |

FOREIGN PATENT DOCUMENTS

| | | |
|---|---|---|
| EP | 0607758 | 7/1994 |
| FR | 2615460 | 11/1988 |
| FR | 2696387 | 4/1994 |
| WO | WO 9746416 | 12/1997 |

OTHER PUBLICATIONS

International Preliminary Report for PCT/EP2008/001729, Oct. 15, 2009.

* cited by examiner

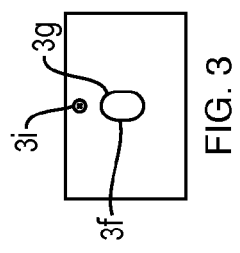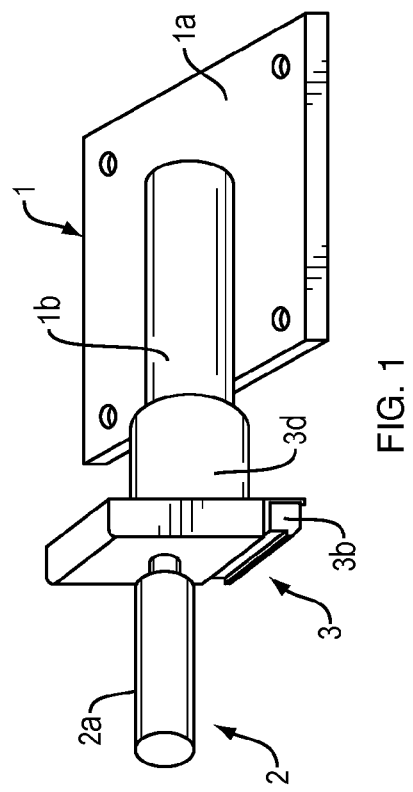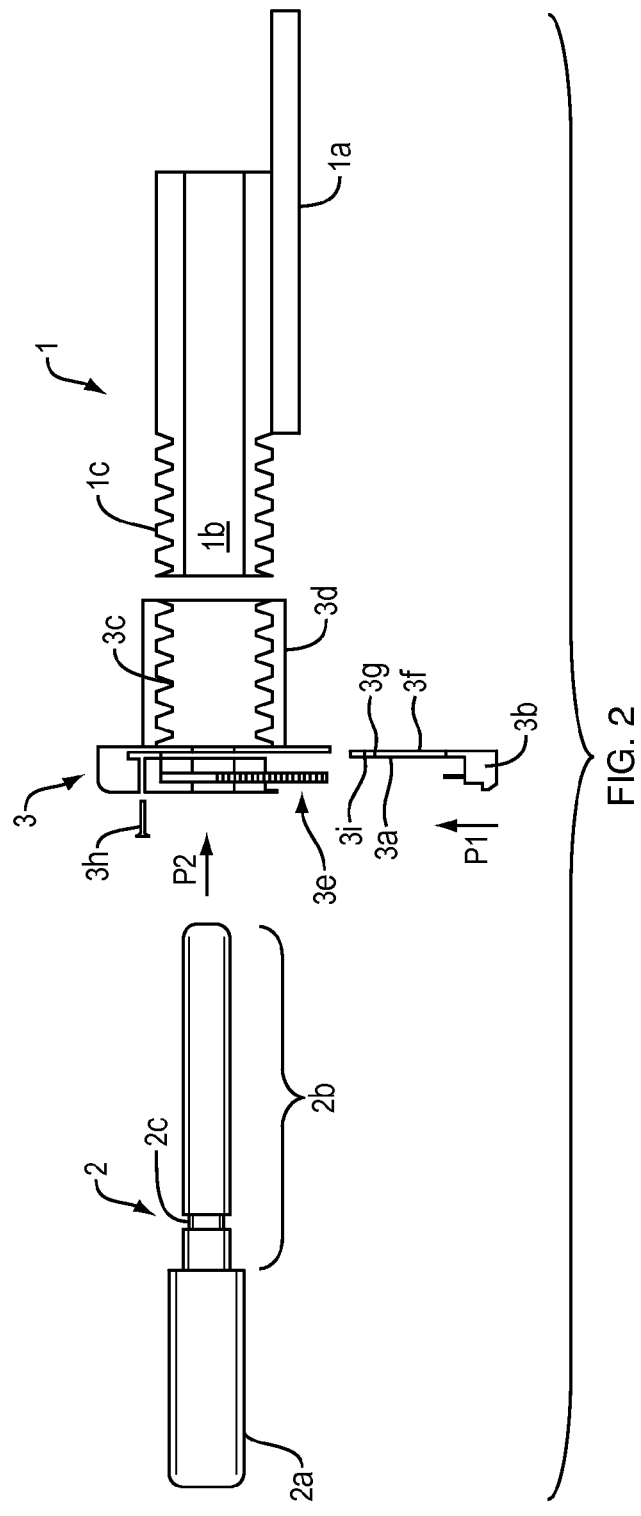

CONNECTION MECHANISM FOR CONNECTION OF ARMRESTS TO TABLES OR CHAIRS

TECHNICAL FIELD

The invention relates to a connection mechanism.

BACKGROUND INFORMATION

In cosmetic tables or cosmetic chairs, as a rule, the armrests are inserted from the side into the table or chair up to a stop during assembly, whereby a receptacle is provided in the side of the table or chair or on the underside of the table into which a matching section of the armrest may be inserted. During normal use of the table, loads are generally applied to the armrests generally perpendicular to the insertion direction by users' arms. However, lateral forces are exerted on the armrests when the user sits or lies down, and when the user stands up. If an armrest is merely inserted, this may lead to a situation in which the armrest is released unexpectedly, providing the risk of injury when the user places weight on the armrest.

This risk may generally be avoided only by proper installation, whereby one cannot see whether the armrests are properly installed in a pre-installed table after such installation.

SUMMARY OF THE INVENTION

It is therefore the task of the invention to propose a connection mechanism to connect armrests to cosmetic tables and/or chairs that does not include these disadvantages.

A securing device is provided based on the invention that engages behind or with a section of the fastening section provided on the table or chair. On the one hand, this measure ensures that the armrest is not released from the table or chair because of pressure on the armrest, and on the other hand, engagement behind the section is acoustically indicated by a snapping sound upon installation so that the installer receives confirmation that the armrest is properly installed.

BRIEF DESCRIPTION OF THE DRAWINGS

These and other features and advantages of the present invention will be better understood by reading the following detailed description, taken together with the drawings wherein:

FIG. 1 is a perspective view of the connection mechanism based on the invention;

FIG. 2 is an exploded, cutaway view of the parts of the connection mechanism based on the invention; and FIG. 3 is a perspective view of the actuation element of the device of the present invention.

DETAILED DESCRIPTION OF THE PREFERRED EMBODIMENTS

The invention is suited to other connections of parts of pieces of furniture such as those intended for sitting or lying. In the following, the example of its use to mount armrests to cosmetic tables and/or cosmetic chairs will be explored.

The connection mechanism shown in FIG. 1 includes a base element 1 that includes a fastening section 1a for attachment to a cosmetic table or a cosmetic chair (not shown). A fastening element 2 is attached to the base element 1 so that it may be detached, whereby the fastening element 2 itself includes a section 2a that is affixed to an armrest (not shown).

Connection of the fastening element 2 and base element 1 is established by means of a securing device 3 that, in this example, is connected to the base element 1, but that could also be a component of the fastening element 2.

As FIG. 2 shows, the base element 1 includes a receptacle 1b configured to receive the fastening element 2, particularly the area 2b of the fastening element 2. Also conceivable is a receptacle on the fastening element 2 into which a section of the base element 1 is received. In such case, the securing device 3 is provided not on the base element 1 as shown, but rather on the fastening element 2.

The securing device 3 is firmly attached to the base element 1 in the illustrated example. A threaded connection may advantageously be provided for this on the securing device 3 by means of threaded section 3c in a bushing-shaped part 3d of the securing device 3 and a matching threaded section 1c on the base element 1. This threaded section 3a is preferably an internal thread, and the matching part 1c thus includes an external thread.

The securing device 3 also includes a securing element 3a that may be actuated by means of an actuation element 3b. The securing element 3a is provided with a recess 3f through which the area 2b of the fastening element 2 may extend when it is received in the receptacle device 1b of the base element 1 whenever the actuation element 3b and thus the securing element 3a connected to the actuation element 3b is pressed inward (along the direction of the arrow P1).

The securing element 3a is pre-tensioned outward, i.e., against the direction of arrow P1 by means of spring 3e. The securing element 3a is held in place by pin 3h that is inserted into opening 3i in the securing element 3a so that when the actuation element 3b is released by removing the pin 3h, it moves in the direction opposite the arrow P1. If the area 2c of the fastening element 2 is located within the recess 3f, then upper edge 3g of the recess 3f as shown in FIG. 3 is pressed against the fastening element 2. When fastening element 2 is inserted into the securing device 3 in the direction of arrow P2, this circumstance ensures that the edge 3g of the recess 3f securing element 3a extends into the area of the rear cut and/or the slot 2c that preferably is formed to surround the area 2b. The edge 3g is configured such that it may enter the slot 2c so that the fastening element 2 engages in receptacle 1b and/or the base element 1 by means of the securing device. The snapping sound signals that the fastening element 2 is properly anchored within the receptacle 1b. Movement against the direction of arrow P2, for example, is thus only possible as long as the actuation element 3b is pressed in the direction of the arrow P1.

Additionally, particularly for stabilization purposes, an additional securing device (not shown) may be provided. This additional securing device is preferably configured such that it includes a second securing element approximately perpendicular to the fastening element 2 that is pre-tensioned against it. This second securing element advantageously engages with an additional recess within the fastening element 2 that is preferably formed as a ring slot. In order to prevent this second securing element from being unintentionally released when attaching the fastening element, a securing or locking screw may be provided. Alternatively, it is possible to lock the second securing element without pre-tensioning merely by tightening the securing or locking screw. The additional securing device is advantageously positioned along the longitudinal direction of the fastening element at a distance from the first securing device 3, and is preferably provided at the receptacle 1b in the area of the front section (along the insertion direction) of the fastening element 2.

Modifications and substitutions by one of ordinary skill in the art are considered to be within the scope of the present invention, which is not to be limited except by the following claims.

The invention claimed is:

1. A connecting mechanism comprising:

an essentially flat planar base element (1) having an essentially flat planar fastening section (1a) for fastening onto a surface of a piece furniture by means of said flat planar base element (1), and wherein the fastening section (1a) include a socket unit (1b) having a longitudinal axis (P2) parallel to an insertion direction of said socket unit (1b) for detachably receiving an area (2b) of a fastening element (2), and wherein said longitudinal axis of said socket unit (1b) is parallel to said flat planar fastening section (1a);

the fastening element (2) configured for attaching to a part which is to be detachably connected to the piece of furniture, wherein the fastening element (2) is configured for being detachably connected parallel to the fastening section (1a); and a securing device (3), configured for engaging with the area (2b) of the fastening element (2) when the area (2b) of the fastening element (2) is received in the socket unit (1b), wherein the securing device (3) is adjustably coupled to said socket (1b) such that said securing device (3) may be adjusted inward and outward on said socket unit (1b) in a direction along said longitudinal axis of said socket unit (1b), and wherein the securing device (3) includes an engagement element (3a) which is pre-tensioned in a first perpendicular direction towards the area (2b) of the fastening element (2) when received in the socket unit (1b), wherein the engagement element (3a) engages in a recess (2c) provided in the area (2b) of the fastening element (2) and wherein the recess (2c) is formed as a groove in the area (2b) of the fastening element (2), wherein the engagement element (3a) includes an opening (3f) through which the area (2b) of the fastening element (2) is configured to pass, wherein the opening (3f) includes an edge (3g) which is configured to enter into and engage with the recess (2c), wherein the securing device (3) has an actuating element (3b) for moving the engagement element (3a) in a second perpendicular direction (P1) that is perpendicular to said longitudinal axis (P2) and opposite said first perpendicular direction, and wherein the engagement element (3a) is pre-tensioned in said first perpendicular direction toward the fastening element (2b) which is received in the socket unit (1b) by means of a spring (3e) imparting a spring tension, and wherein when said engagement element (3a) is moved in said second perpendicular direction against said spring tension and then subsequently released, the engagement element (3a) moves in the first perpendicular direction to allow removal of the fastening element (2) from within the socket unit (1b).

2. The connecting mechanism according to claim 1 characterized in that the securing device (3) is adjustably couple by threads to the socket unit (1b).

3. The connecting mechanism according to claim 1 characterized in that the recess (2c) is configured as a circumferential groove.

4. The connecting mechanism according to claim 1, wherein the engagement element (3a) is held in place by a pin (3h) that is inserted into an opening (3i) in the engagement element (3a) so that when the actuation element (3b) is released by removing the pin (3h), the pre-tensioned engagement element (3a) moves in an opposite direction perpendicular to the longitudinal axis direction and in a direction away from the fastening element (2b) which is received in the socket unit (1b).

* * * * *